United States Patent [19]
Terauchi

[11] Patent Number: 5,905,907
[45] Date of Patent: May 18, 1999

[54] MICROCOMPUTER LOADED WITH PROM AND DATA READ-OUT TESTING METHOD FOR SAME

[75] Inventor: Youji Terauchi, Tokyo, Japan

[73] Assignee: NEC Corporation, Tokyo, Japan

[21] Appl. No.: 08/950,597

[22] Filed: Oct. 15, 1997

[30] Foreign Application Priority Data

Oct. 15, 1996 [JP] Japan .................................. 8-272058

[51] Int. Cl.⁶ .............................. G06F 9/22; G06F 12/06
[52] U.S. Cl. ...................... 395/828; 395/183.06; 711/2; 365/189.05
[58] Field of Search ............................. 395/825, 800.43, 395/712, 500, 186, 800.32, 893, 880, 284, 828, 555, 876, 834, 183.06, 570, 381, 571; 711/164, 2, 103, 218; 370/395; 365/230.08, 189.05, 105, 175; 364/489, 488; 345/352

[56] References Cited

U.S. PATENT DOCUMENTS

| | | | |
|---|---|---|---|
| 5,307,464 | 4/1994 | Akao et al. ............................. | 345/352 |
| 5,632,024 | 5/1997 | Yajima et al. .......................... | 395/381 |
| 5,754,764 | 5/1998 | Davis et al. ............................ | 395/555 |

FOREIGN PATENT DOCUMENTS 62-98437   5/1987   Japan .

*Primary Examiner*—Daniel H. Pan
*Attorney, Agent, or Firm*—Foley & Lardner

[57] ABSTRACT

A data reading testing method of a microcomputer loaded with a PROM being conducted under a normal operation mode. Setting the operation mode of the microcomputer to a ROM-less mode. Setting the externally extended function under the ROM-less mode. Diverging addresses to an externally extended region. Setting the microcomputer to the normal operation mode, upon which a CPU is to fetch instructions being previously provided to applicable addresses of the externally extended region, and to read the data from the PROM. Reading the data from the PROM. Evaluating the read data and terminating the reading test.

8 Claims, 15 Drawing Sheets

F I G. 3
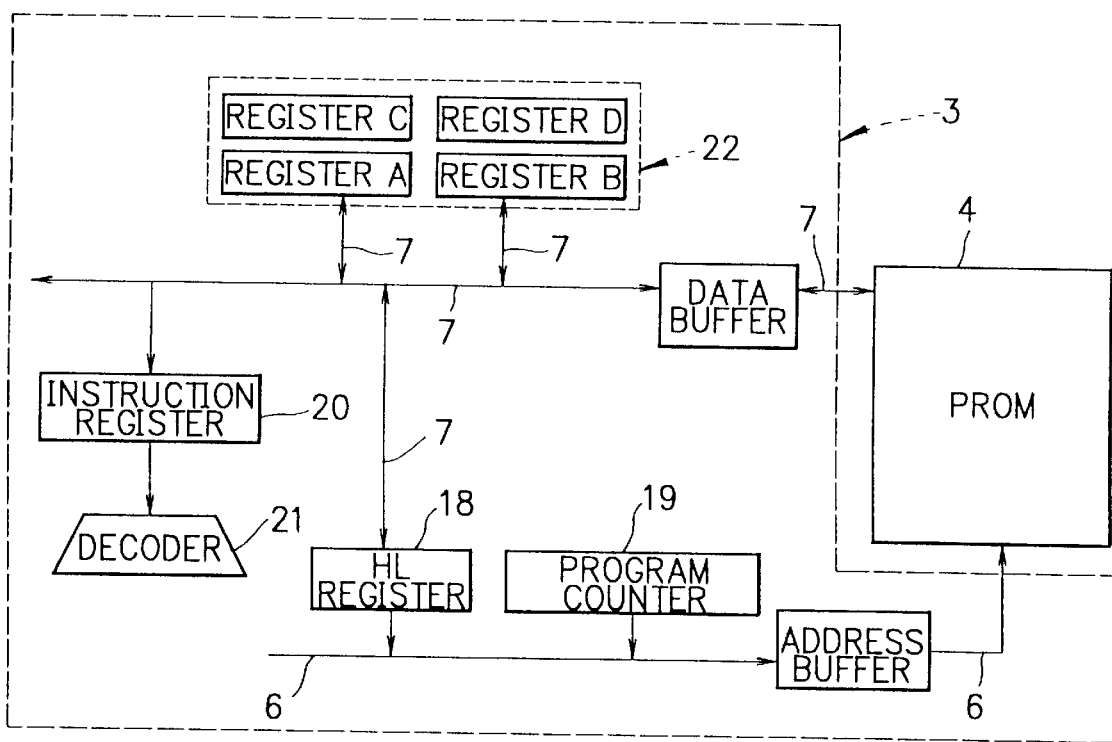

F I G. 9
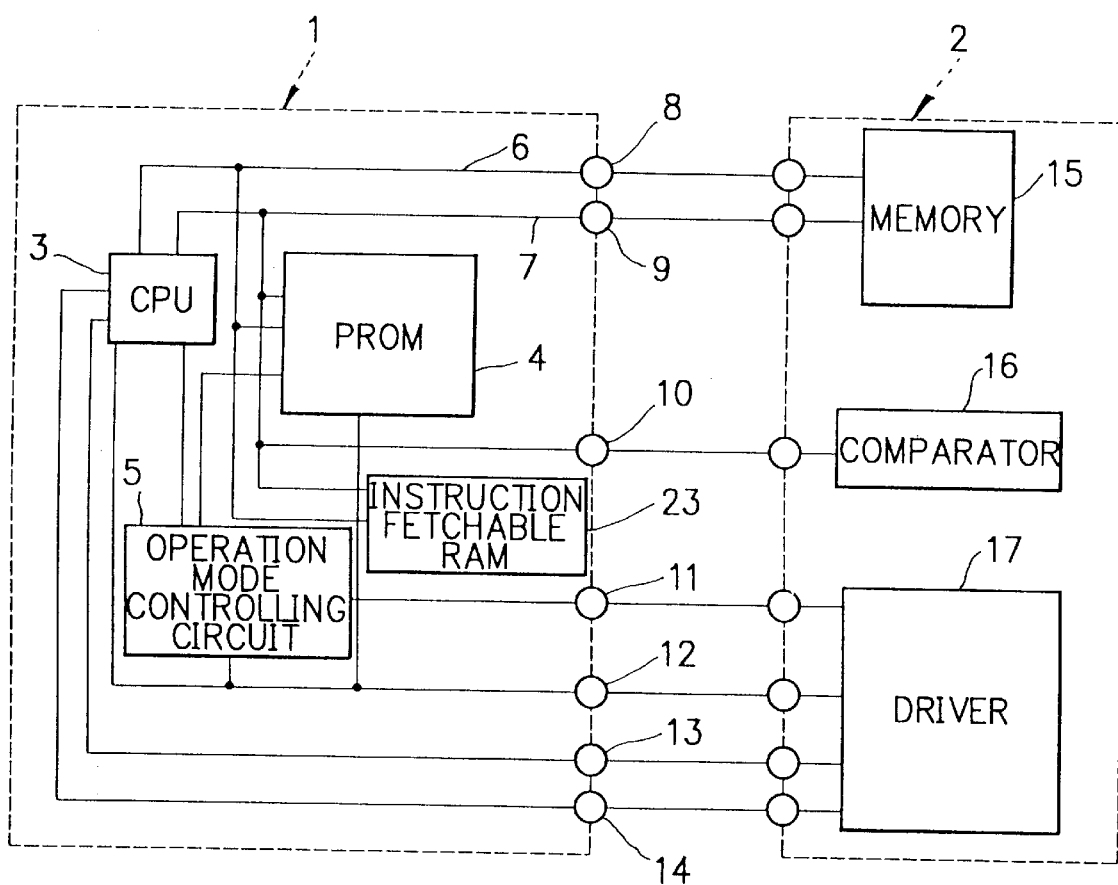

F I G. 12
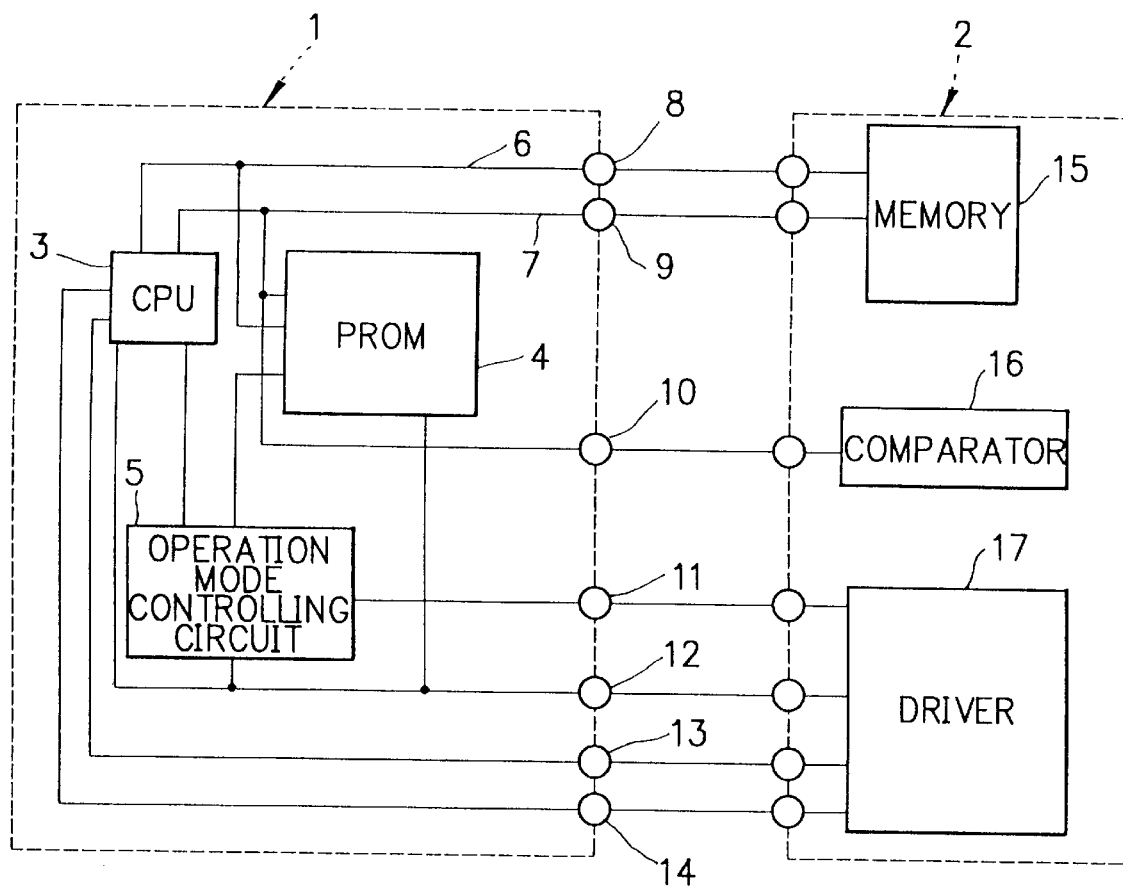

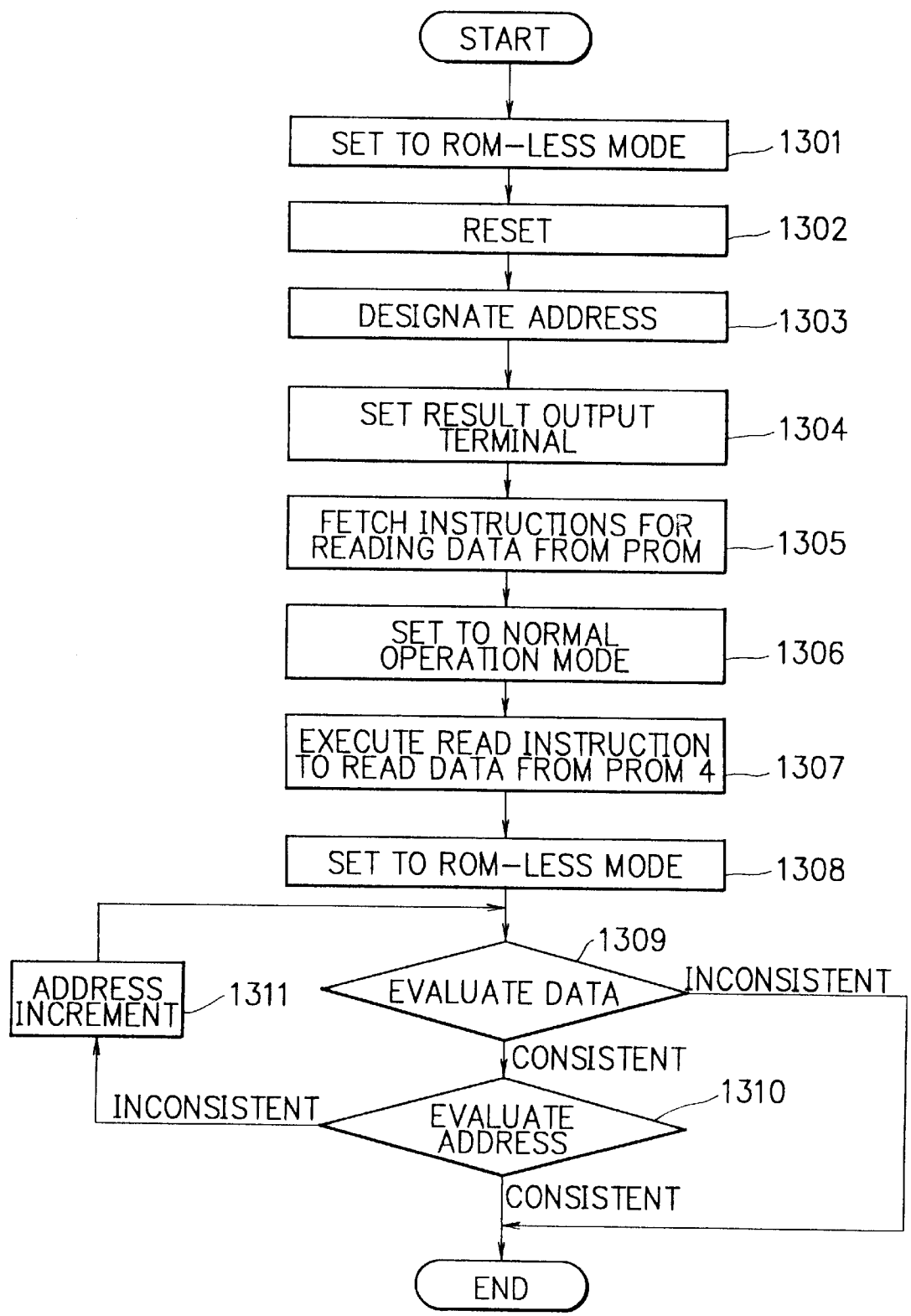

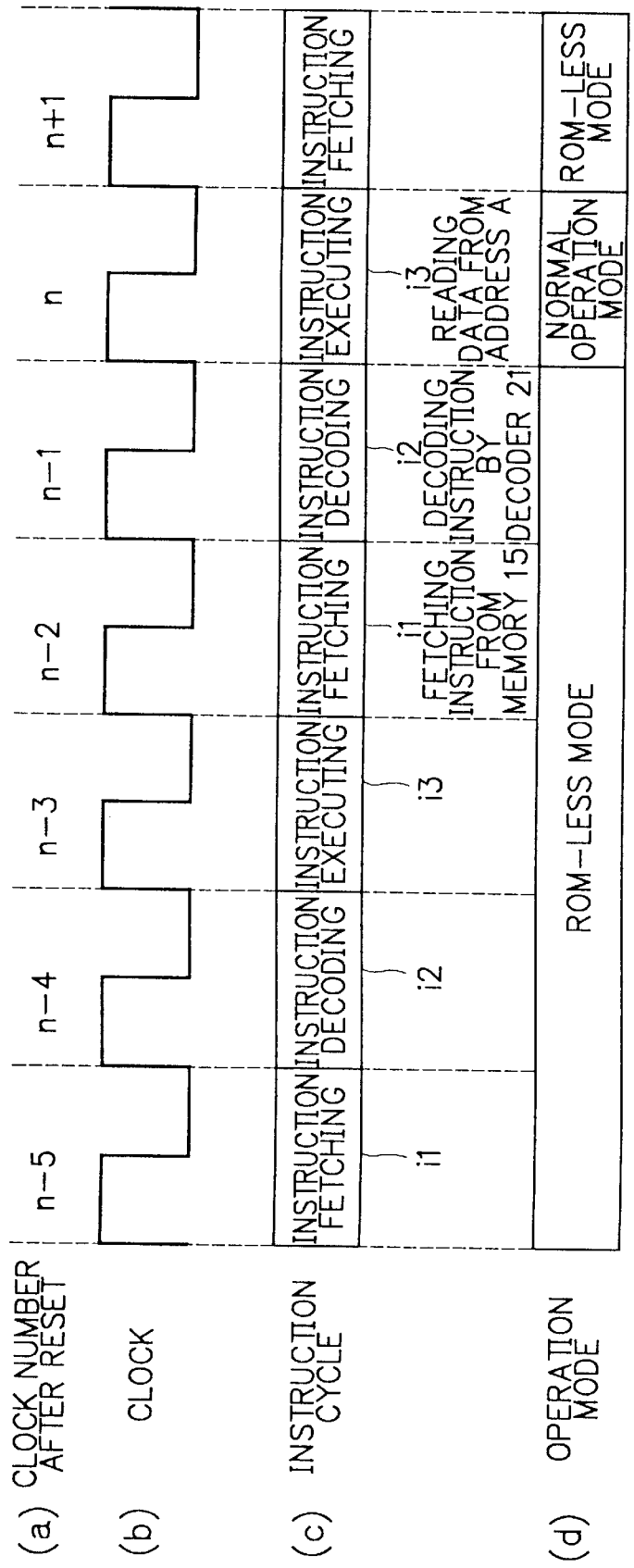

MICROCOMPUTER LOADED WITH PROM AND DATA READ-OUT TESTING METHOD FOR SAME

BACKGROUND OF THE INVENTION

The present invention relates to a single-chip microcomputer having a semiconductor substrate being loaded with peripheral equipment including a CPU (central processing unit), a ROM (read-only memory), a RAM (random-access memory), a timer, a serial input/output, an A/D converter and so forth. In particular, the present invention relates to a microcomputer loaded with a PROM (programmable non-volatile semiconductor memory), and to a method of testing a read-out operation of the data of the PROM.

DESCRIPTION OF THE RELATED ART

Conventionally, a microcomputer has been required to test its CPU being loaded for its operation, especially, for the data read-out operation with regard to the memory. One example of a microcomputer of this kind which enables such a testing is disclosed in Japanese Patent Laid-Open 62-98437. FIG. 1 is a structural figure showing a basic structure of a conventional microcomputer. In this figure, a microcomputer 1 is composed of a CPU 3, a PROM 4, a testing ROM 4T, an operation mode controlling circuit 5, etc. Those constituents of the microcomputer are connected to one another by an address bus 6 and a data bus 7 which are at the same time connecting the microcomputer 1 with an address input/output terminal 8, a data input/output terminal 9 and an operation mode setting terminal 11. Here, the testing ROM 4T stores instructions for testing the microcomputer 1. Moreover, the operation mode controlling circuit 5 has a function for switching a normal operation mode to a testing mode, and vice versa.

According to the microcomputer 1, under a first operation mode which indicates that the operation mode controlling circuit 5 is under the normal operation mode, the CPU 3 is to take in the instructions from the PROM 4 and execute those instructions being acquired. On the other hand, when the operation mode controlling circuit 5 is switched to a second operation mode, namely the testing mode, by having a signal given to the operation mode setting terminal 11 in an attempt to test the data read-out operation of the CPU 3, the CPU 3 is to take in the instructions from the testing ROM 4T and carry out the instructions. In conclusion, in accordance with this particular way of testing, the test for the data read-out operation of the CPU 3 is conducted by having the microcomputer 1 set to a testing mode so as to carry out the testing instructions being stored in the testing ROM.

As for the conventional microcomputer, under the testing mode, the testing for the data read-out operation is being conducted by reading out and processing the data stored in the testing ROM 4T. In this manner, however, the CPU 3 has no access to the PROM4 under the testing mode. Therefore, it is impossible to perform the data read-out of the data from the PROM 4. Although the CPU 3 is capable of gaining access to the PROM 4 under the normal operation mode, the PROM 4 is of a canceling state under the testing mode indicating that the PROM 4 has no memory region for storing testing instructions. Consequently, the test for the data read-out of the data from the PROM 4 is not possible. Hence, according to the conventional microcomputer, it is impossible to practice the data read-out test under the normal operation mode, namely the operation mode when the microcomputer is normally in use, as well as within a memory region of the PROM which is used under normal conditions. Thus, there has been noted a problem that it is difficult to ascertain the reliability of the microcomputer.

SUMMARY OF THE INVENTION

It is therefore an object of the present invention to provide a microcomputer which is capable of conducting a reading operation of data from a PROM under a normal operation mode, and to propose a corresponding data read-out testing method.

According to one aspect of the present invention, there is provided a microcomputer having a CPU, a PROM, an operation mode controlling circuit for switching a normal operation mode to a ROM-less mode and vice versa and an externally extended function, comprising: a fetching means for fetching instructions from an externally extended region; and a reading means for reading data from the PROM according to the instructions being fetched by the above fetching means.

In accordance with another aspect of the present invention, there is provided a microcomputer having a CPU, a PROM, an operation mode controlling circuit for switching a normal operation mode to a ROM-less mode and vice versa and an instruction fetchable RAM comprising: a fetching means for fetching instructions from the instruction fetchable RAM; and a reading means for reading data from the PROM according to the instructions being fetched by the fetching means.

According to still another aspect of the present invention there is provided a microcomputer having a CPU, a PROM, and an operation mode controlling circuit for switching a normal operation mode to a ROM-less mode and vice versa, comprising: a reading means for reading data from the PROM, the reading means having a ROM-less mode setting means, an address designating means, a result outputting means, a data reading means for reading the data from the PROM, a data outputting means for outputting the read data and an address comparing means.

As to one feature of a data reading testing method of a microcomputer according to the present invention, the testing method comprises: a mode setting stage for setting the operation mode of the microcomputer to the ROM-less mode; a fetching stage for fetching instructions from an exterior of a CPU under the ROM-less mode; an address diverging stage for setting the externally extended function and diverging addresses to an externally extended region; a data reading stage for setting the microcomputer to the normal operation mode and executing instructions being provided to the externally extended region beforehand so as to read data from the PROM; and an evaluating stage for evaluating the read data.

With regard to another feature of a data reading testing method of a microcomputer according to the present invention, the testing method comprises: a mode setting stage for setting the operation mode of the microcomputer to the ROM-less mode; an address diverging stage for fetching instructions from an exterior of a CPU under the ROM-less mode, forwarding the instructions for reading the data from the PROM to the instruction fetchable RAM and address diverging the addresses to the memory region of the instruction fetchable RAM; a data reading stage for setting the microcomputer to the normal operation mode where the CPU fetches instructions from the instruction fetchable RAM so as to read the data from the PROM; and an evaluating stage for evaluating the read data.

As to still another feature of a data reading testing method of a microcomputer according to the present invention, the data reading testing method comprises: a mode setting stage for setting the operation mode of the microcomputer to the ROM-less mode; a fetching stage for fetching instructions from an exterior of a CPU for reading the data from the PROM under the ROM-less mode; a mode setting stage for setting the operation mode of the microcomputer to the normal operation mode; a data reading stage for executing the fetched instructions so as to read the data from the PROM; and an evaluating stage for evaluating the read data.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

BRIEF DESCRIPTION OF THE DRAWINGS

FIG. 3 is a block diagram of an internal structure of a CPU;

FIG. 9 is a block diagram of a microcomputer corresponding to a second embodiment of the present invention;

FIG. 12 is a block diagram of a microcomputer corresponding to a third embodiment of the present invention;

FIG. 14 is a flowchart illustrating a testing process of the third embodiment of the present invention; and FIG. 15 is a view showing the operation timing of the third embodiment of the present invention.

DESCRIPTION OF THE PREFERRED EMBODIMENTS

Figure 1:
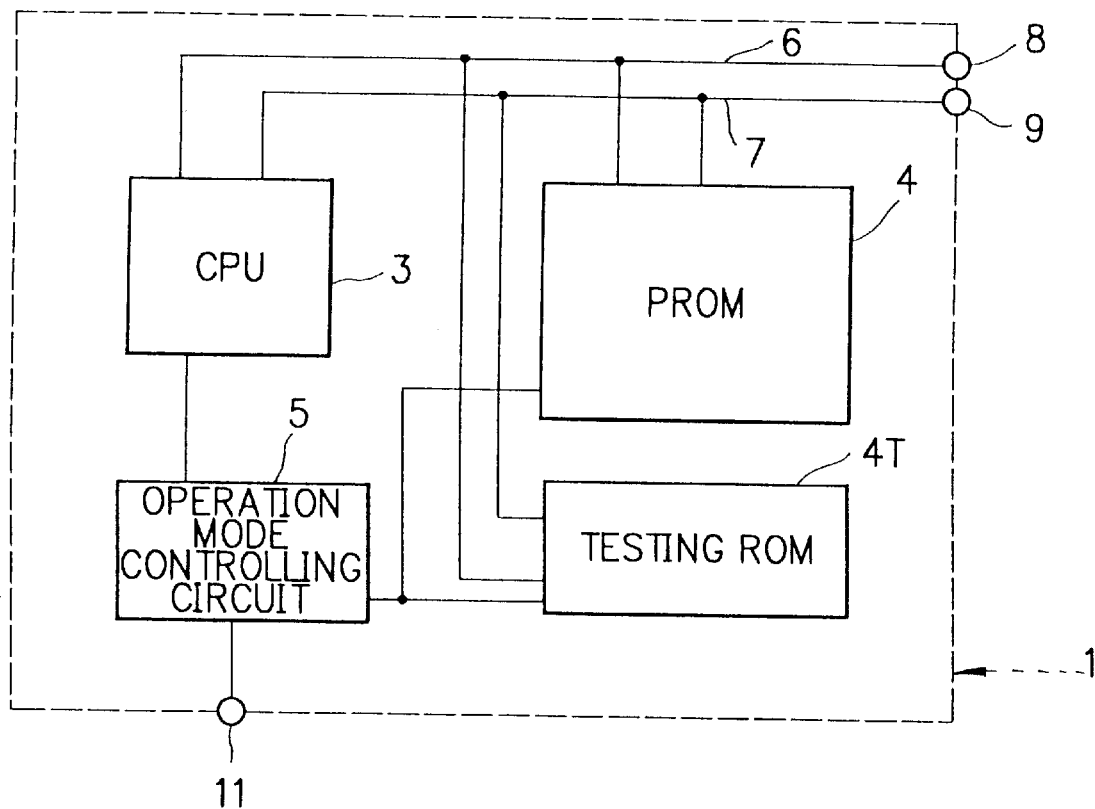
FIG. 1 is a block diagram of one example of a conventional microcomputer.

Referring now to the drawings, a microcomputer of the present invention loaded with a PROM and a corresponding testing method of a data read-out operation will become apparent from the following description of the preferred embodiments of the invention.

Figure 2:
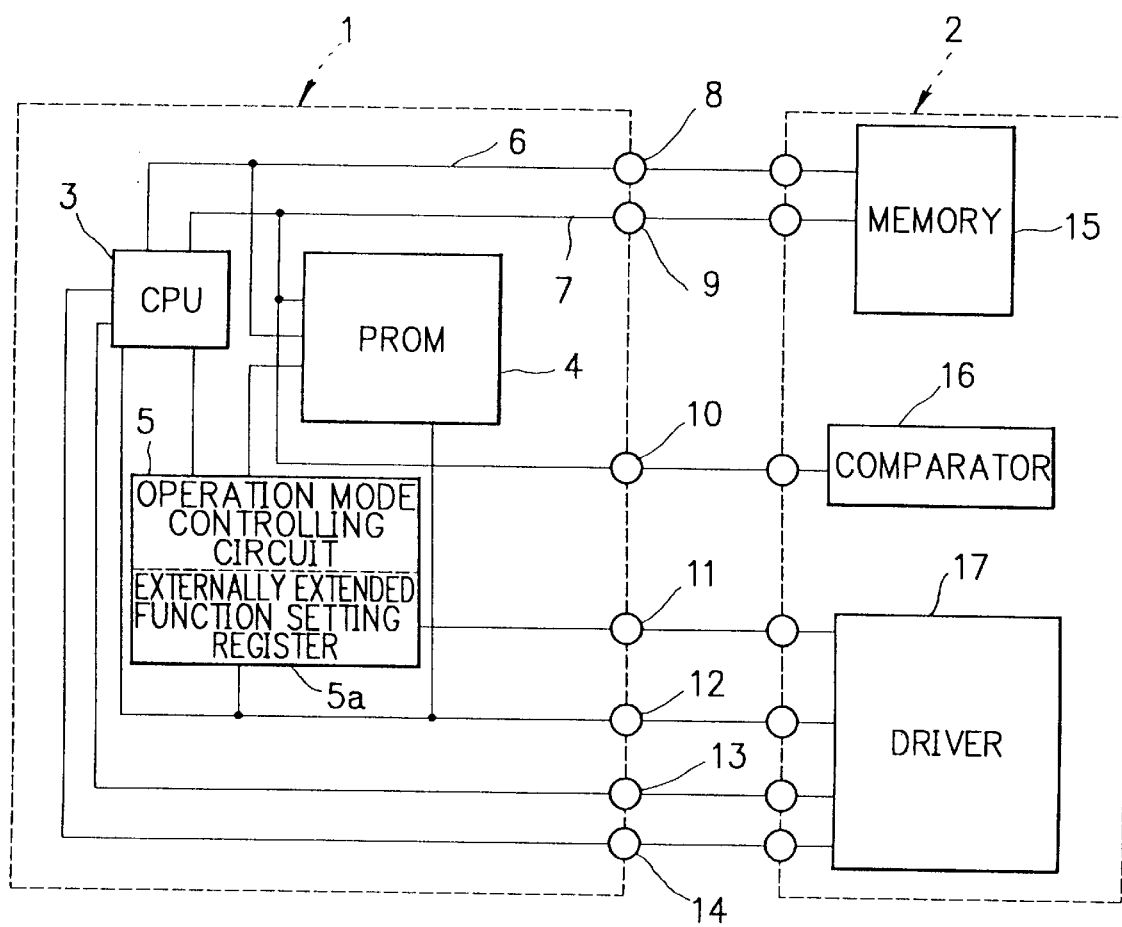
FIG. 2 is a block diagram of a microcomputer corresponding to a first embodiment of the present invention.

A description of a first embodiment of the present invention will now be given with reference to FIG. 2. FIG. 2 shows a block structure of a microcomputer 1 of the first embodiment. In this figure, the microcomputer 1 is shown as being connected to a LSI tester. The LSI tester will be described later in detail. The microcomputer 1 is composed of a CPU 3, a PROM 4, an operation mode controlling circuit 5 for controlling an operation mode of the microcomputer and an externally extended function setting register 5a, and connected to an address input/output terminal 8, a data input/output terminal 9 and a result output terminal 10 by an address bus 6 and a data bus 7. Furthermore, the externally extended function setting register 5a has an operation mode controlling terminal 11 and a reset terminal 12 being connected, while the CPU 3 has clock input terminals 13 and 14 being connected. In addition, the PROM 4 has addresses A to B being assigned for the sake of convenience.

FIG. 3 is a block diagram showing an internal structure of the CPU 3. The CPU 3 includes a HL register 18 for address designation, a program counter 19 for address designation, an instruction storing register 20, an instruction decoding decoder 21 and a data storing register 22. Those constituents of the CPU 3 are connected to one another by an address bus 6 and a data bus 7. The address stored in the program counter 19 is increased by one address every time an instruction is being carried out. The HL register 18 is capable of designating the address.

Figure 4:
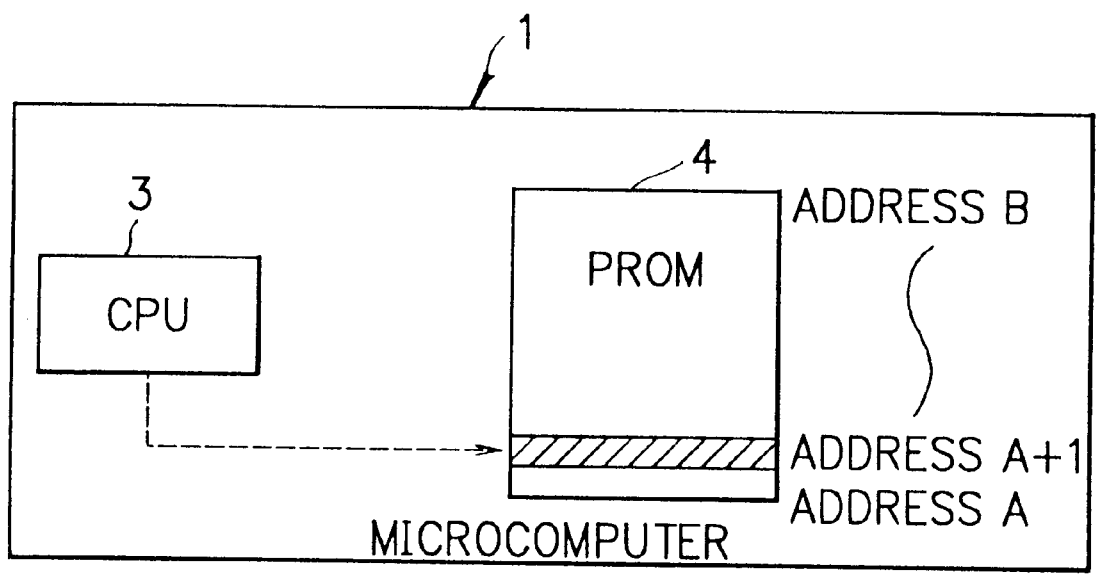
FIG. 4 is a view for describing a normal operation mode of a microcomputer.
Figure 5:
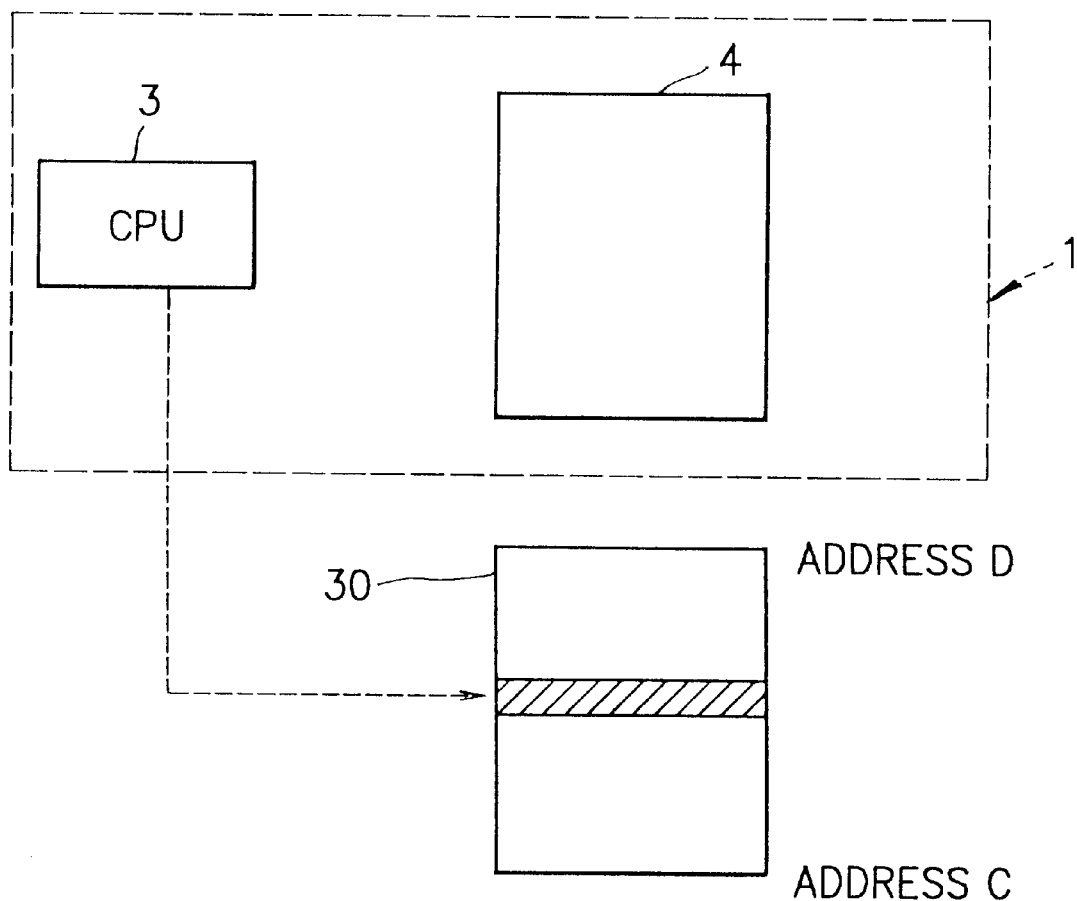
FIG. 5 is a view for describing an externally extended function of the microcomputer.
Figure 6:
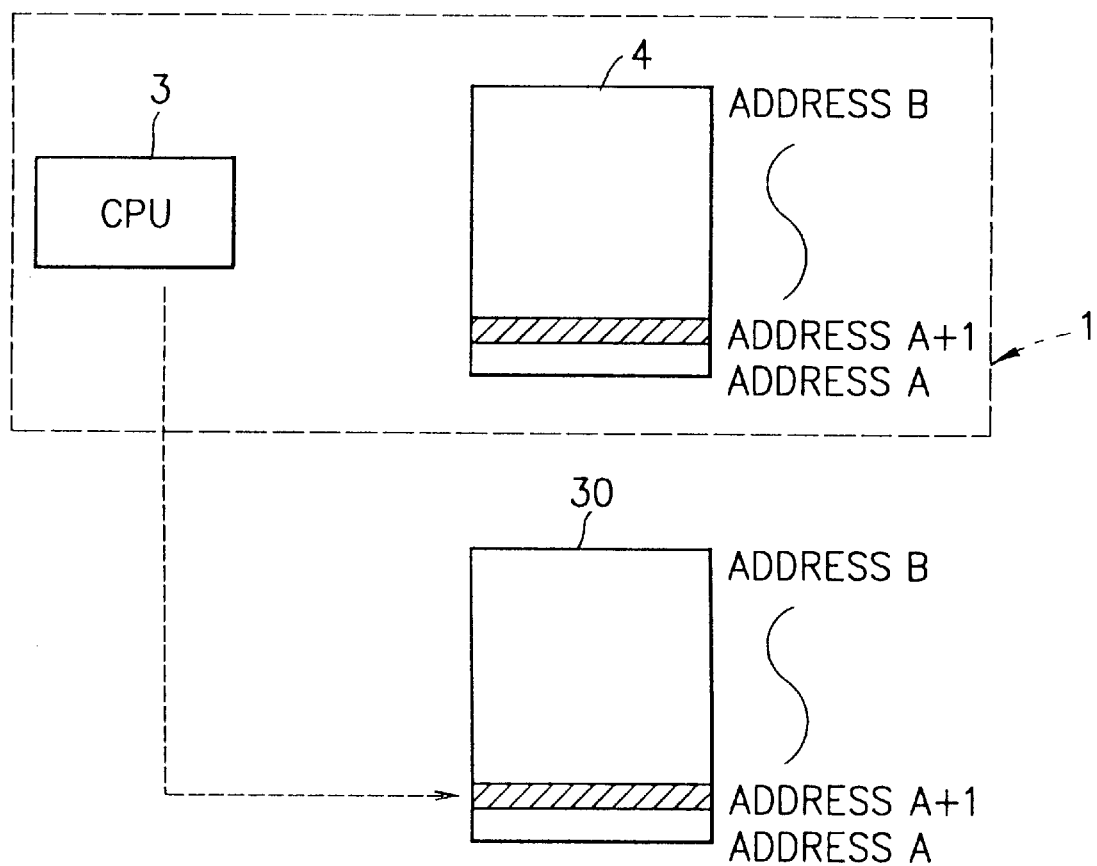
FIG. 6 is a view for describing a ROM-less mode of the microcomputer.

Next, the operation mode of the microcomputer 1 is to be described with reference to FIG. 4 or FIG. 5. The microcomputer 1 consists of two operation modes including the normal operation mode and the ROM-less mode. It is possible to control the operation modes from the outside of the microcomputer 1 by having a signal inputted to the operation mode controlling terminal 11. FIG. 4 is a diagram describing the normal operation mode. For example, when the CPU 3 of the microcomputer 1 accesses to the address (A +1), it is going to fetch an instruction of the address (A+1) from the PROM 4. Moreover, FIG. 6 is a diagram explaining the ROM-less mode. To the exterior of the microcomputer 1, there is equipped an external memory 30 having the same addresses A to B as the PROM 4 being assigned. For example, when the CPU 3 of the microcomputer 1 accesses to the address (A+1) under the ROM-less mode, the CPU 3 is going to fetch an instruction of the address (A+1) from the external memory 30 of the microcomputer 1. FIG. 5 is a diagram for describing the externally extended function. Being provided that the externally extended region is defined by addresses C to D, when setting the externally extended function setting register 5a and having the CPU 3 access to the externally extended region, the instructions of addresses C to D from the external memory 30 are to be fetched regardless of the operation mode.

Figure 7:
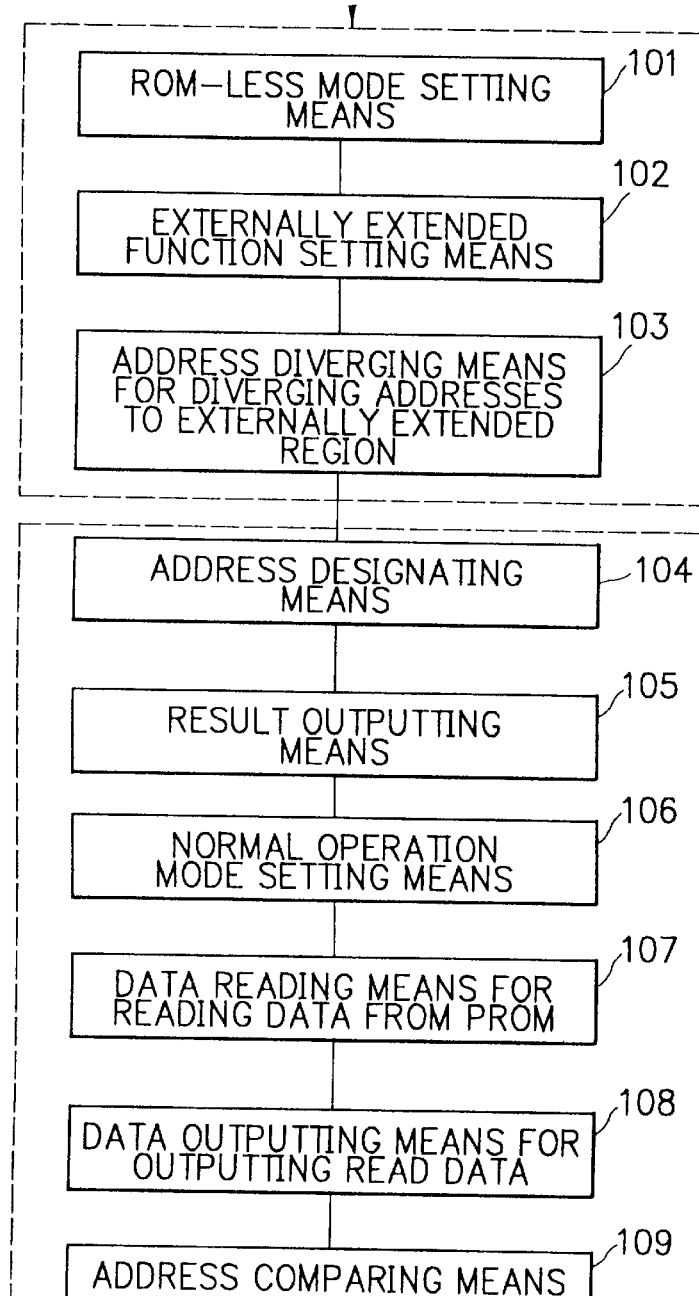
FIG. 7 is a view showing the principal means of the first embodiment of the present invention.

On referring to FIG. 7, 10A is a means of fetching the instructions from the externally extended region. The fetching means 10A for fetching the instructions from the externally extended region includes a ROM-less mode setting means 101, an externally extended function setting means 102, and an address diverging means 103 for branching off the addresses to the externally extended region. After providing a signal to the operation mode setting terminal 11 from the exterior of the microcomputer 1, the ROM-less mode setting means 101 gives a signal to the reset terminal 12 from the exterior of the microcomputer 1 so as to reset the microcomputer 1 and have the microcomputer 1 set to the ROM-less mode. The externally extended function setting means 102 is to fetch the instructions from the exterior of the microcomputer 1 so as to write the value on the externally extended function register and set the externally extended function. The address diverging means 103 for diverging the addresses to the externally extended region is to fetch the instructions from the exterior of the microcomputer 1 so as to branch off the addresses to the externally extended region.

On the other hand, 10B is a means of reading the data from the PROM. This reading means 10B for reading the data from the PROM consists of an address designation means 104, a result outputting means 105, a normal operation mode setting means 106, a reading means 107 for reading the data from the PROM, a data outputting means 108 for outputting the read data, and an address comparing means 109. The address designation means 104 is to fetch the instructions from the exterior of the microcomputer 1, and store the head address and the end address of the address region of the PROM 4 to the assigned region. The result outputting means 105 is to fetch the instructions from the exterior of the microcomputer 1, and set the terminal for outputting the read data to the result output terminal 10. The normal operation mode setting means 106 is to supply a signal to the operation mode setting terminal 11 from the exterior of the microcomputer 1 so as to set the microcomputer 1 to the normal operation mode. The reading means 107 for reading the data from the PROM is to fetch the instructions from the externally extended region, and read the data from the PROM 4 which has been set. The data outputting means 108 for outputting the read data is to fetch the instructions from the exterior of the microcomputer 1, and output the read data from the result output terminal 10. The address comparing means 109 is to compare the data of the read address with the end address being set. When the two addresses coincide with each other as a result of comparison, the operation is to terminate. On the other hand, when the read address is smaller, the address is to be augmented, and the operation will return to the control of the PROM data reading means 107. The operation also terminates when the read address is larger.

Next, a testing operation for a data read-out from the PROM 4 with regard to the microcomputer having the structure indicated above will be described. When referring to FIG. 2, the LSI tester 2 being connected to the microcomputer 1 consists of a memory 15 for storing the instructions to be used in testing the microcomputer 1, a comparator 16 for comparing the outputted data of the microcomputer 1 with the expected value from which PASS or FAIL is determined, and a driver 17 for giving a signal for controlling the microcomputer 1. The address bus 6 and the data bus 7 of the microcomputer 1 are connected to the memory 15 of the LSI tester 2 via the address input/output terminal 8 and the data input/output terminal 9. Accordingly, when it is either under ROM-less mode or when the CPU 3 accesses to the externally extended region, the memory 15 of the LSI tester 2 is to become an external memory from which the instructions are to be fetched. The data output terminal 10 of the microcomputer 1 is connected to the comparator 16 of the LSI tester 2. Thus, it is possible to determine PASS or FAIL by comparing the outputted data from the result output terminal 10 of the microcomputer 1 with the expected value. The operation mode controlling terminal 11, the reset terminal 12 and the clock input terminals 13 and 14 are connected to the driver 17 of the LSI tester 2. Therefore, setting the operation mode, resetting, and setting the operation speed of the microcomputer 1 are all possible to be carried out from the LSI tester 2.

In the memory 15 of the LSI tester 2, there are previously provided the following instructions.
From address A to address B:

(Instruction 1) An instruction for setting the result output terminal.

(Instruction 2) An instruction for designating the head address and the end address of the PROM 4.

(Instruction 3) An instruction for setting the externally extended function.

(Instruction 4) An instruction for diverging to the externally extended region, addresses C to D.

(Instruction 5) An instruction for reading the data from the PROM 4.

(Instruction 6) An instruction for outputting the read data from the result output terminal.

(Instruction 7) An instruction for comparing the read address with the end address of the PROM.

(Instruction 8) An instruction for augmenting the address.

Figure 8:
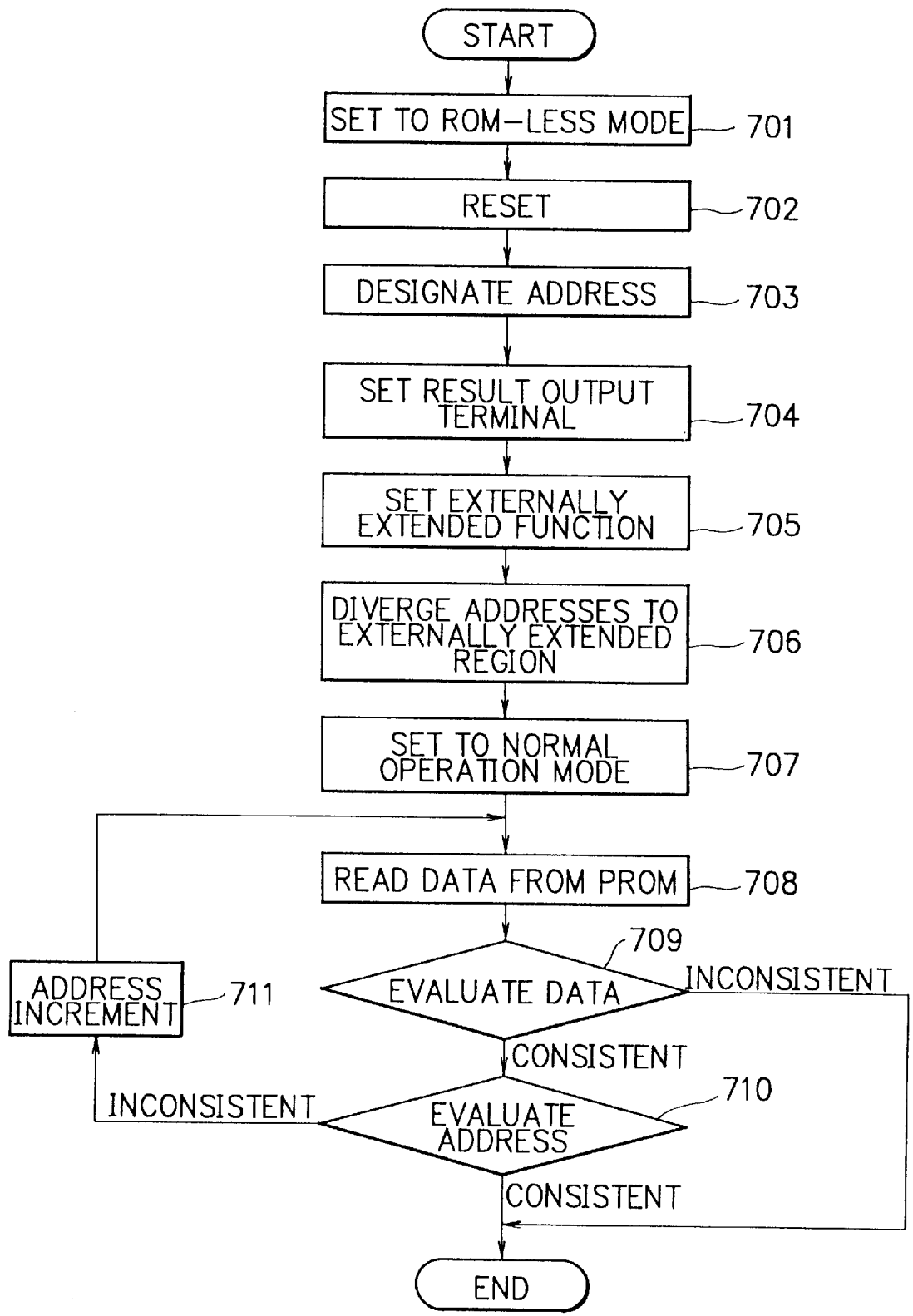
FIG. 8 is a flowchart illustrating a testing process of the first embodiment of the present invention.

Being provided that the memory 15 of the LSI tester 2 is previously being supplied with the above instructions, as it is indicated in the flowchart of the testing operation shown in FIG. 8, the ROM-less mode setting means 101 is to give a signal to the operation mode setting terminal 11 and a reset signal to the reset terminal 12 so as to set the microcomputer 1 to the ROM-less mode (steps S701 and S702). Under the ROM-less mode, the CPU 3 is to fetch the instructions from the memory 15 of the LSI tester beyond address A. Therefore, the address designation means 104, the result outputting means 105, the externally extended function setting means 102 and the fetching means 103 for fetching the instructions from the externally extended region are capable of fetching instructions 1, 2, 3 and 4 which are previously provided to the memory 15. Then the CPU 3 is to execute the fetched instructions. As a result, the head address and the end address of the memory region to be read are respectively set so that the head address becomes address A and the end address becomes address B (step S703). Moreover, the terminal for outputting the result is set to the result output terminal 11 (step S704). Furthermore, after the externally extended function is being set (step S705), the addresses are to diverge to the externally extended region (step S706).

A normal operation mode setting means 106 is to provide a signal to the microcomputer 1 from the driver 17 of the LSI tester 2 so as to set the operation mode of the microcomputer 1 to the normal operation mode (step S707). Since the addresses are branched off to the externally extended region, the reading means 107 for reading the data from the PROM, the data outputting means 108 for outputting the read data and the address comparing means 109 are capable of fetching instructions 5, 6, 7 and 8 being previously provided to addresses C to D of the memory 15. Moreover, since it is under the normal operation mode, on the execution of instruction 5, the data form address A of the memory region of the PROM of the microcomputer 1 is to be read (step S708). The data outputting means 108 for outputting the read data is to output the data to the result output terminal 10. The comparator 16 of the LSI tester 2 is to compare the read data with the expected value. Then, when the two coincide with each other, the procedure is to go on to the following instruction. On the other hand, when the read data and the expected value are inconsistent with each other, the test is to terminate (step S709). Next, according to instruction 7 fetched from the memory 15, the address comparing means 109 is to compare the read address with the end address B. When either the read address and the end address B coincide with each other or the read address is larger than the end address B, the test is to terminate. When the read address is smaller than the end address B the read address is to be augmented, and the procedure is to return to step S709 (steps S710 and S711).

For example, in such a case where the PROM 4 has a memory capacity of 32 kilobytes, the head address is address 0000H, the end address is address 7FFFH, the head address of the externally extended region is address 8000H and the end address of the externally extended region is address BFFFH, the memory 15 of the LSI tester 2 is to have the following instructions being provided beforehand.

From address 0000H to address 7FFFH:

(Instruction 1) Setting the terminal for outputting the result to the result output terminal 10.

(Instruction 2) Setting the HL register 18 to 0000H, and the BC register 22 to 7FFFH.

(Instruction 3) Setting the externally extended function register so as to set the externally extended mode.

(Instruction 4) Setting the program counter 19 to 8000H.

Beyond address 8000H:

(Instruction 5) Reading the data of the address being set at the HL register 18.

(Instruction 6) Outputting the read data from the result output terminal 10.

(Instruction 7) Comparing the data of the HL register 18 with the data of the BC register 22.

(Instruction 8) Increasing the data of the HL register 18 by one address.

Being provided that the memory 15 of the LSI tester 2 is previously being supplied with the above instructions, at step S708, the data of address 0000H being set at the HL register 18 is to be read. Since the microcomputer 1 is under the normal operation mode, the data of address 0000H of the PROM 4 is to be read. Moreover, at step S710, 0000H being set at the HL register 18 and 7FFFH being set at the BC register 22 are to be compared. Since HL<BC, the HL register 18 is to be set to 0001H, and the procedure is to return to step S708. Steps S708 to S709 are repeated until the HL register 18 becomes 7FFFH, and when the HL register 18 becomes 7FFFH, the test is to terminate.

As it has been described above, according to the present embodiment, it is possible to conduct the read-out test for the data of the PROM under the normal operation mode by storing instructions for reading the data from the PROM in the externally extended region which is capable of fetching the instructions under the normal operation mode.

Figure 10:
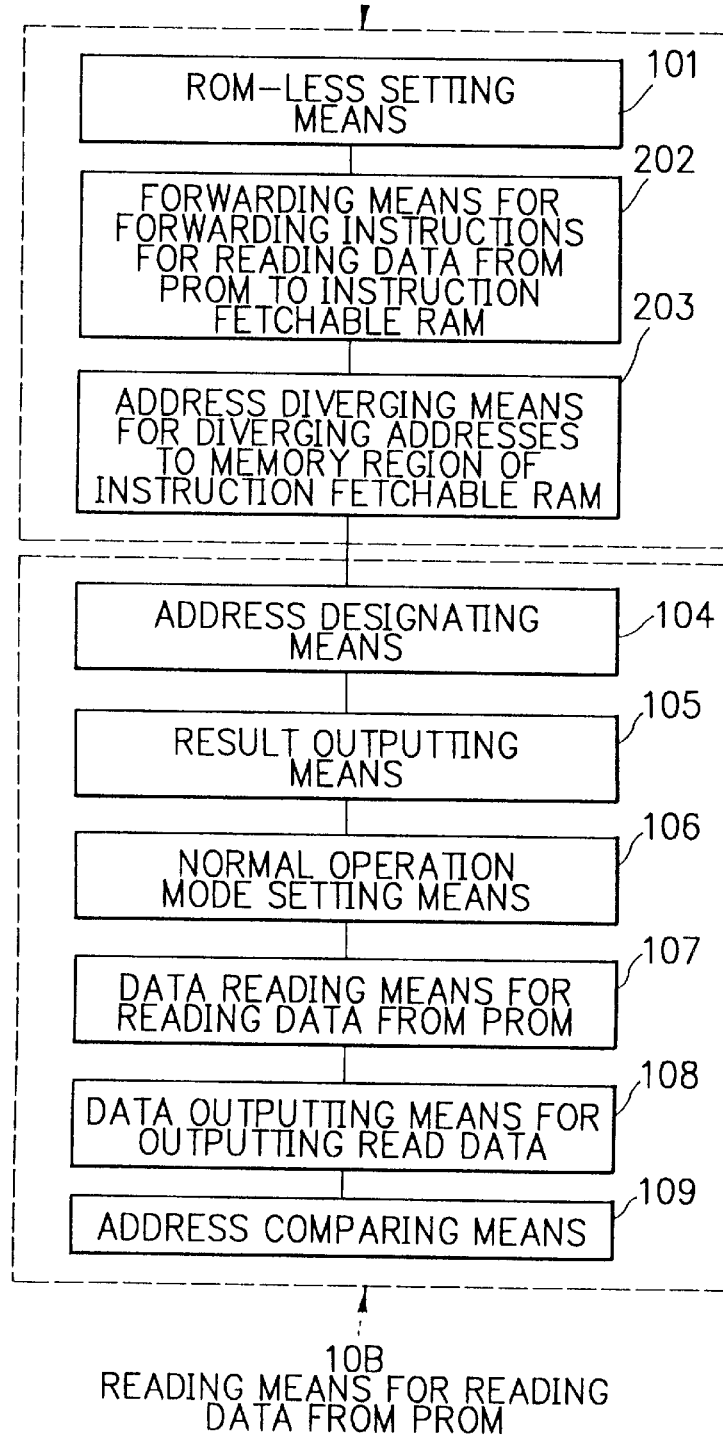
FIG. 10 is a view showing the principal means of the second embodiment of the present invention.

Now, a description of a second embodiment of the present invention will be given with reference to FIG. 9. In this figure, as to parts which are equivalent to those shown in FIG. 2, same codes are to be used. In this particular embodiment, a microcomputer 1 is to be characterized by not having the externally extended function setting register 5a, and by having equipped with an instruction fetchable RAM 23 within the microcomputer 1. Moreover, as it is shown in FIG. 10, the second embodiment consists of a fetching means 20A for fetching instructions from the instruction fetchable RAM instead of the fetching means 10A for fetching the instructions from the externally extended region as in the first embodiment. That is to say, the fetching means 20A for fetching instructions from the instruction fetchable RAM includes a ROM-less mode setting means 101, a forwarding means 202 for forwarding the instructions for reading the data from the PROM to the memory region of the instruction fetchable RAM and an address diverging means 203 for diverging the addresses to the memory region of the instruction fetchable RAM. The storing means 202 for storing the instructions to the instruction fetchable RAM is to fetch the instructions from the exterior of the microcomputer 1, so as to forward to the instruction fetchable RAM the instructions for reading the data from the PROM 4. The address diverging means 203 for diverging the addresses to the memory region of the instruction fetchable RAM is to fetch the instructions from the exterior of the microcomputer 1, so as to branch off the addresses to the memory region of the instruction fetchable RAM.

The operation of data reading from the PROM 4 according to the second embodiment of the present invention is to be described in detail with reference to the drawings. First of all, a memory 15 of a LSI tester 2 is to have the following instructions being provided beforehand.

(Instruction 1) An instruction for setting the result output terminal.

(Instruction 2) Forwarding the following instructions 21, 22, 23 and 24 to the instruction fetchable RAM.

(Instruction 21) An instruction for reading the data from the PROM 4.

(Instruction 22) An instruction for outputting the read data form the result output terminal.

(Instruction 23) An instruction for comparing the read address with the end address of the PROM.

(Instruction 24) An instruction for augmenting the address.

(Instruction 3) An instruction for designating the head address and the end address of the PROM 4.

(Instruction 4) Diverging the addresses to the memory region of the instruction fetchable RAM.

Figure 11:
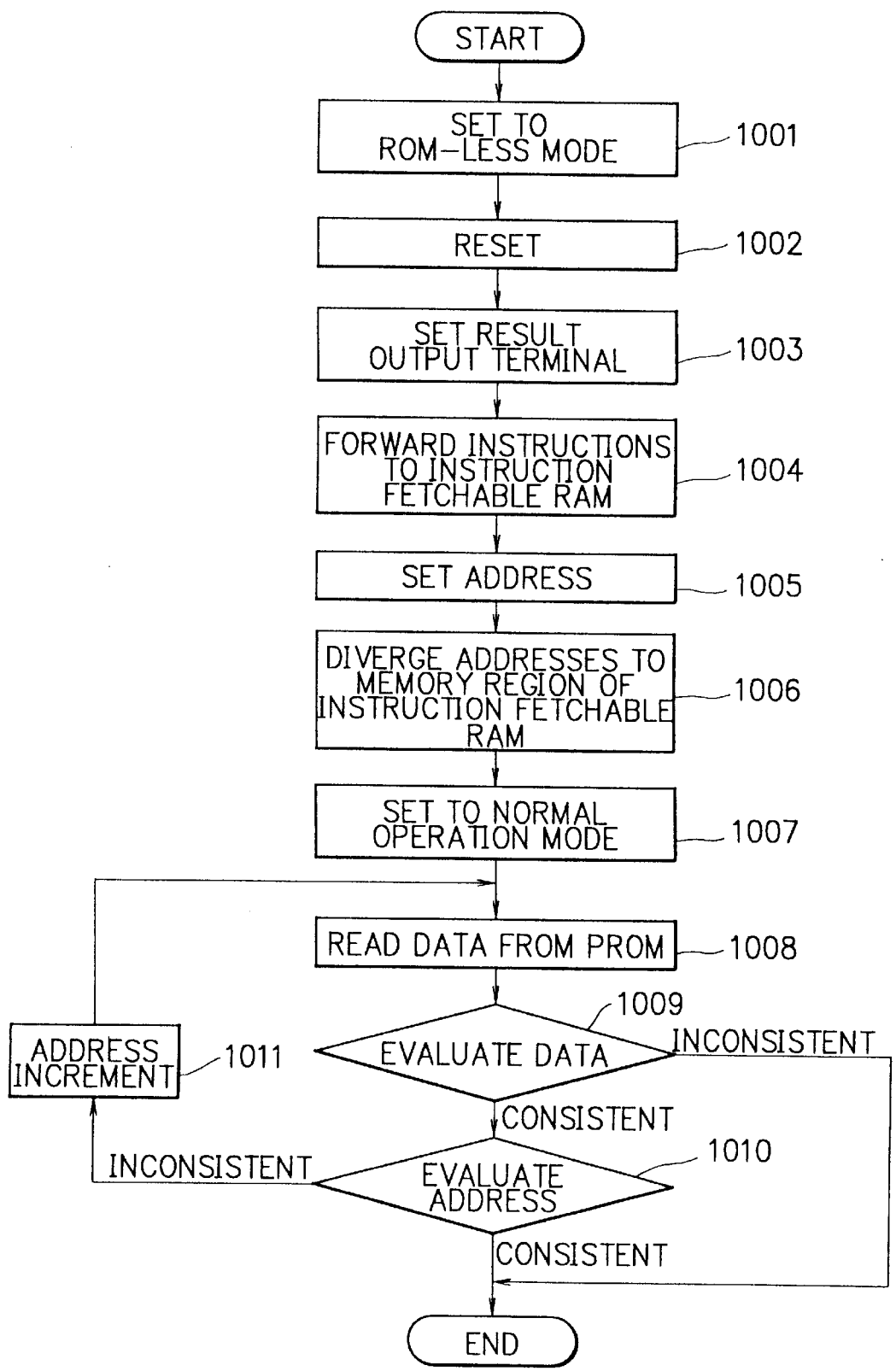
FIG. 11 is a flowchart illustrating a testing process of the second embodiment of the present invention.

FIG. 11 is a flowchart of the reading operation according to the second embodiment. Since the operations under steps S1001 and S1002 are the same as steps S701 and S702 of the first embodiment, explanations for steps S1001 and S1002 are to be omitted. Subsequently, the forwarding means 202 for forwarding the instructions for reading the data from the PROM to the instruction fetchable RAM is to carry out instruction 3 being fetched from the memory 15 of the LSI tester 2 so as to forward instructions 21, 22, 23 and 24 to the instruction fetchable RAM 23 (step S1004). Next, the address diverging means 203 for diverging the addresses to the address region of the instruction fetchable RAM is to fetch instruction 4 from the memory 15 of the LSI tester 2, so as to set the address to address C (step S1006).

A normal operation mode setting means 106 is to have a driver 17 give a signal to an operation mode controlling terminal 11 of the microcomputer 1, so as to set the microcomputer 1 to the normal operation mode (step S1007). After that, the CPU 3 of the microcomputer 1 is to carry out instructions 21, 22, 23 and 24, which are being stored in the instruction fetchable RAM 23, under the normal operation mode. Additionally, since the operations of steps S1008, S1009, S1010 and S1011 are the same as steps S708, S709, S710 and S711 of the first embodiment shown in FIG. 8, descriptions of steps S1008, S1009, S1010 and S1011 are to be omitted.

For example, it is to be assumed that the PROM 4 has a memory capacity of 32 kilobytes, the head address is address 0000H and that the end address is address 7FFFH. Furthermore, it is to be assumed that the instruction fetchable RAM has a memory capacity of 1 kilobyte, the head address is address 8000H, the end address is address 83FFH, and that the CPU of the microcomputer 1 has a ZW register which is capable of indirect address designation like the HL register 18. The memory 15 of the LSI tester 2 is to be provided with the following instructions for reading the data from the PROM 4 beyond address 1FFFH.

Beyond address 1FFFH:

(Instruction 21) Reading the data of the address being designated by the HL register.

(Instruction 22) Outputting the read data from the result output terminal 10.

(Instruction 23) Comparing HL register with the BC register.

(Instruction 24) Increasing the HL register by one H.

The following instructions are to be provided beyond address 0000H.

(Instruction 1) Setting the terminal for outputting the result to the result output terminal 10.

(Instruction 2) Setting 1FFFH to the HL register, 8000H to the HL register and forwarding the content of the address being designated at the HL register to the content of the address being designated at the ZW register. After the forwarding, the HL register and the ZW register are respectively increased. When instructions 21 to 24 are being forwarded, the operation is to terminate.

(Instruction 3) Setting 0000H to the HL register, and 7FFFH to the BC register.

(Instruction 4) Setting the program counter to 8000H.

Instruction 2 is an instruction for forwarding the instructions for reading the data from the PROM to the instruction fetchable RAM 23. To begin with, the address of the memory where instruction 21 is stored is set to the HL register. Moreover, the address of the forwarding destination is to be set to the ZW register. Next, the content of the address being designated at the HL register is to be forwarded for example, to an A register, and the content of the A register is to be forwarded to the address being designated at the ZW register. Through the above method, it is possible to forward to the instruction fetchable RAM the instructions for reading the data form the PROM. Then, as the instructions being stored in the instruction fetchable RAM are being executed under the normal operation mode, the reading of the data from the PROM 4 becomes possible. The explanation for the embodiment of the reading of data from the PROM 4 is to be omitted since it is the same as the first embodiment.

Figure 13:
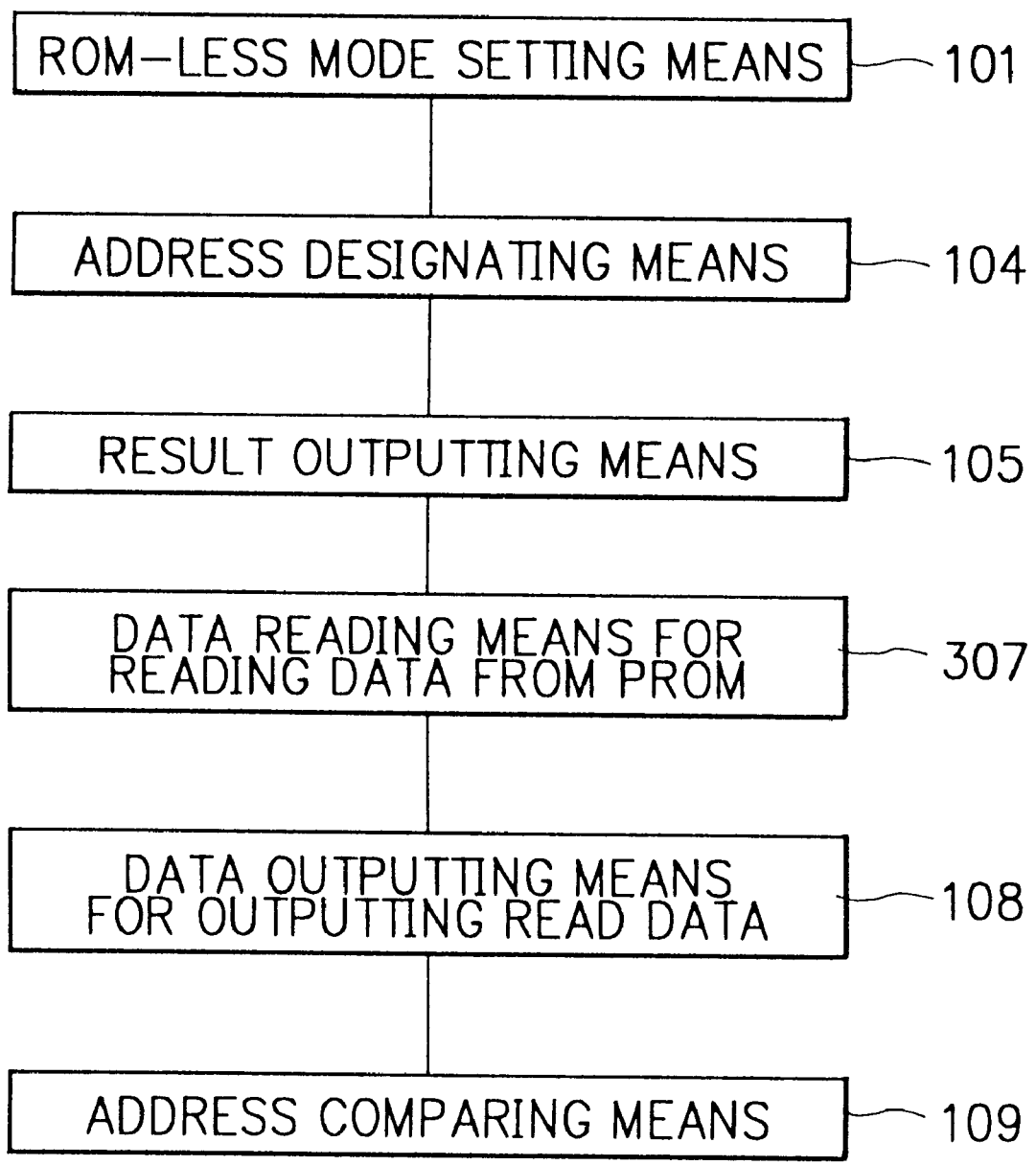
FIG. 13 is a view showing the principal means of the third embodiment of the present invention.

FIG. 12 is a block diagram of a third embodiment of the present invention. As to the parts equivalent to those of the above indicated embodiments, the same codes are to be used. A microcomputer 1 of this particular embodiment is characterized by not having the externally extended function setting register and the instruction fetchable RAM. Furthermore, on referring to FIG. 13, it becomes obvious that the third embodiment of the present invention is characterized by the fact that the microcomputer 1 operates only with a reading means 307 for reading the data from the PROM under the normal operation mode. First of all, the reading means 307 for reading the data from the PROM is to fetch the instructions from the exterior of a CPU 3 of the microcomputer 1 under the ROM-less mode. Then the data reading means 307 is to provide a signal to an operation mode controlling terminal from the exterior of the microcomputer 1 so as to set the microcomputer 1 to the normal operation mode. Due to having the CPU carrying out the instructions being fetched, the data from the PROM is to be read out. After that, the data reading means 307 is to give a signal to the operation mode controlling terminal from the exterior of the microcomputer 1 so as to set the microcomputer 1 to the ROM-less mode.

Now, the reading operation of the data from the PROM of the third embodiment is to be described with reference to FIG. 14. The memory 15 of the LSI tester 2 is to be previously provided with the following instructions.

(Instruction 1) An instruction for setting the result output terminal.

(Instruction 2) An instruction for designating the head address and the end address of the PROM 4.

(Instruction 3) An instruction for reading the data from the PROM 4.

(Instruction 4) An instruction for outputting the read data from the result output terminal.

(Instruction 5) An instruction for comparing the read address with the end address of the PROM.

(Instruction 6) An instruction for increasing the address.

Since the operations of steps S1301, S1302, S1303 and S1304 shown in FIG. 14 are the same as steps S701, S702, S703 and S704 shown in FIG. 8, explanations for steps S1301, S1302, S1303 and S1304 are to be omitted. The reading means 307 for reading the data from the PROM is to fetch instruction 3 from the memory 15 of the LSI tester 2 (step S1305), after which the reading means 307 is to have the driver 17 of the LSI tester 2 give a signal to the operation mode controlling terminal 11 of the microcomputer 1 so as to set the microcomputer 1 to the normal operation mode (step S1306). Then the data from the PROM 4 can be read by having executed the instructions being fetched under the normal operation mode (step S1307). Then the operation is to proceed to the following instruction by having a signal given to the operation mode controlling terminal 11 of the microcomputer 1 by the driver 17 of the LSI tester 2, which sets the microcomputer 1 to the ROM-less mode (step S1308). In addition, since the operations of steps S1309, S1310 and S1311 are the same as steps S709, S710 and S711 shown in FIG. 8, descriptions for steps S1309, S1310 and S1311 are to be omitted.

For instance, it is to be assumed that PROM 4 has a 32 kilobytes of memory capacity, a head address of address 0000H, and an end address of address 7FFFH. Furthermore, the memory 15 of the LSI tester 2 is to have the following instructions being provided in advance.

(Instruction 1) Setting the terminal of the result output to the result output terminal 10.

(Instruction 2) Setting 0000H to the HL register, and 7FFFH to the BC register.

(Instruction 3) Reading the data of the address designated at the HL register 18.

(Instruction 4) Outputting the read data from the result output terminal 10.

(Instruction 5) Comparing the HL register with the BC register.

(Instruction 6) Increasing the HL register by one H.

The CPU 3 of the microcomputer 1 being set to the ROM-less mode by the ROM-less mode setting means 101 is to fetch the above instructions from the memory 15 of the LSI tester 2. The reading means 307 for reading the data from the PROM is to fetch instruction 3 from the memory 15 of the LSI tester 2 under ROM-less mode. When referring to FIG. 15, the instructions of the CPU 3 of the microcomputer 1 include instruction fetching (i1), instruction decoding (i2) and instruction executing (i3). The clock number is to be counted ahead of time starting from the resetting of the microcomputer 1 till the fetching of instruction 3. For example, in such a case where the instruction fetching (i1) of instruction 3 is done at a clock number (n−2) counted from the resetting, the operation mode of the microcomputer 1 is to be set to the normal operation mode at a clock number (n−1). Then, according to the instruction executing (i3) at a clock number n, the data from the PROM 4 is to be read.

As it has been described above, according to the present invention, the operation mode of the microcomputer is set to the ROM-less mode under which the CPU is to fetch the instructions from the exterior or to fetch the instructions after having the instructions being forwarded to the instruction fetchable RAM within the microcomputer, and further, the instructions of the external memory having the same addresses as the PROM are to be fetched, upon which the operation mode of the microcomputer is set to the normal operation mode under which the instructions are carried out to have the data of the PROM read and evaluated. Thus, it is possible to test for reading of data within the normally used memory region of the PROM under the same operation mode as when the microcomputer is normally in use, which leads to improvements on the microcomputer with regard to its reliability, its quality, and its inferiority detection rate at a time of shipping inspection.

While preferred embodiments of the invention have been described using specific terms, such description is for illustrative purposes only, and it is to be understood that changes and variations may be made without departing from the spirit or the scope of the following claims.

What is claimed is:

1. A microcomputer having a CPU, a PROM connected to the CPU, and an operation mode controlling circuit for switching a normal operation mode to a ROM-less mode and vice versa and an externally extended function, comprising:
   a fetching means for fetching instructions from an externally extended region; and
   a reading means for reading data from the PROM during the normal operation mode according to the instructions being fetched by the above fetching means.

2. A microcomputer according to claim 1, wherein:
   said fetching means for fetching the instructions from the externally extended region comprises a ROM-less mode setting means, an externally extended function setting means, and an address diverging means for diverging addresses to the externally extended region, and
   said reading means for reading the data from the PROM comprising an address designating means, a result outputting means for setting a result output terminal for outputting the read data to the result output terminal, a normal operation mode setting means, a data reading means for reading the data from the PROM, a data outputting means for outputting the read data and an address comparing means.

3. A data reading testing method of a microcomputer having a CPU, a PROM connected to the CPU, an operation mode controlling circuit for switching a ROM-less mode to a normal operation mode and vice versa and an externally extended function, comprising:
   a mode setting stage for setting the operation mode of the microcomputer to the ROM-less mode;
   a fetching stage for fetching instructions from an exterior of the CPU under the ROM-less mode;
   an address diverging stage for setting the externally extended function and diverging addresses to an externally extended region where the externally extended region is external to the PROM;
   a data reading stage for setting the microcomputer to the normal operation mode, and executing instructions being provided to the externally extended region beforehand so as to read data from the PROM during the normal operation mode; and
   an evaluating stage for evaluating the read data.

4. A microcomputer having a CPU, a PROM connected to the CPU, an operation mode controlling circuit for switching a normal operation mode to a ROM-less mode and vice versa and an instruction fetchable RAM, where the instruction fetchable RAM is connected to the PROM and is within the microcomputer comprising:
   a fetching means for fetching instructions from the instruction fetchable RAM; and
   a reading means for reading data from the PROM during the normal operation mode according to the instructions being fetched by the above fetching means.

5. A microcomputer according to claim 4, wherein:
   said fetching means for fetching the instructions from the instruction fetchable RAM comprises a ROM-less mode setting means, a forwarding means for forwarding to the instruction fetchable RAM the instructions for reading the data from the PROM, and an address diverging means for diverging addresses to a memory region of the instruction fetchable RAM, and
   said reading means for reading the data from the PROM comprising an address designating means, a result outputting means for setting a result output terminal for outputting the read data to the result output terminal, a normal operation mode setting means, a data reading means for reading the data from the PROM, a data outputting means for outputting the read data and an address comparing means.

6. A data reading testing method of a microcomputer having a CPU, a PROM connected to the CPU, an operation mode controlling circuit for switching a ROM-less mode to a normal operation mode and vice versa and an instruction fetchable RAM, comprising:
   a mode setting stage for setting the operation mode of the microcomputer to the ROM-less mode;
   an address diverging stage for fetching instructions from an exterior of a CPU under the ROM-less mode, forwarding the instructions for reading data from the PROM to the instruction fetchable RAM and address diverging the addresses to the memory region of the instruction fetchable RAM;
   a data reading stage for setting the microcomputer to the normal operation mode, under which the CPU fetches instructions from the instruction fetchable RAM so as to read the data from the PROM during the normal operation mode; and
   an evaluating stage for evaluating the read data.

7. A microcomputer having a CPU, a PROM connected to the CPU, and an operation mode controlling circuit for switching a normal operation mode to a ROM-less mode and vice versa, comprising:
   a reading means for reading data from the PROM during the normal operation mode, the reading means having a ROM-less mode setting means, an address designating means, a result outputting means, a data reading means for fetching instructions from the exterior of the CPU under the ROM-less mode and to provide a signal to an operator mode controlling terminal to set the microcomputer to normal operation mode, a data outputting means for outputting the read data and an address comparing means.

8. A data reading testing method of a microcomputer having CPU, a PROM connected to the CPU, and an operation mode controlling circuit for switching a ROM-less mode to a normal operation mode and vice versa, comprising:
   a mode setting stage for setting the operation mode of the microcomputer to the ROM-less mode;
   a fetching stage for fetching instructions from an exterior of a CPU for reading data from the PROM under the ROM-less mode;
   a mode setting stage for setting the operation mode of the microcomputer to the normal operation mode;
   a data reading stage for executing the fetched instructions so as to read the data from the PROM during the normal operation mode; and
   an evaluating stage for evaluating the read data.

* * * * *